United States Patent [19]

Frieser et al.

[11] 3,982,918

[45] Sept. 28, 1976

[54] PROCESS FOR PREPARING A COPPER CONTAINING SEALING GLASS

[75] Inventors: Rudolf G. Frieser, Poughkeepsie; Jimmie L. Powell; Rao R. Tummala, both of Wappingers Falls, all of N.Y.

[73] Assignee: International Business Machines Corporation, Armonk, N.Y.

[22] Filed: Apr. 28, 1975

[21] Appl. No.: 572,036

[52] U.S. Cl. .................................. 65/66; 65/32; 65/36; 65/43; 65/86; 65/134; 65/121; 106/47 R; 106/47 Q; 106/53
[51] Int. Cl.² .................. C03B 9/00; C03B 23/20; C03B 5/16; C03C 3/00
[58] Field of Search ............... 65/134, 32, 43, 36, 65/66, 86, 121; 106/47 Q, 47 R, 53

[56] References Cited
UNITED STATES PATENTS

| | | |
|---|---|---|
| 2,922,720 | 1/1960 | Parks .............................. 65/134 X |
| 3,443,921 | 5/1969 | Bolvent ........................... 65/134 X |
| 3,639,113 | 2/1972 | Aslanova et al. ................. 65/32 |
| 3,759,727 | 9/1973 | Dietz ............................... 106/47 R |
| 3,807,043 | 4/1974 | Hikino ............................. 65/43 X |
| 3,892,904 | 7/1975 | Tanaka ............................ 65/32 X |
| 3,904,426 | 9/1975 | Frieser et al. ................... 65/134 X |

*Primary Examiner*—S. Leon Bashore
*Assistant Examiner*—Frank W. Miga
*Attorney, Agent, or Firm*—David M. Bunnell

[57] ABSTRACT

A copper oxide containing seal glass is formed by a controlled low temperature process which reduces the formation of seeds in the glass. In one embodiment the glass is prepared in two portions with the first portion containing the high melting oxides and the second portion containing the low melting oxides. The copper oxide is added to the second portion and the two portions are combined to form the seal glass at temperatures below about 800°C which reduces the formation of $Cu_2O$ crystals in the glass.

5 Claims, No Drawings

PROCESS FOR PREPARING A COPPER CONTAINING SEALING GLASS

BACKGROUND OF THE INVENTION

This invention relates generally to low softening, low thermal expansion coefficient seal glasses and more particularly to a process for preparing a copper oxide containing glass useful in forming gas tight glass seals and the glass compositions prepared thereby.

Low softening point, low thermal expansion coefficient copper containing glass compositions are useful in sealing various surfaces such as ceramics, metals, and glasses and for joining such surfaces together. Such copper glasses are used, for example, to seal together the glass substrates used to form gas display panels in which a gas is contained in a space between electrode bearing glass substrates. The gas is ionized by applying a potential to various electrode segments in order to form visible alphanumeric characters.

One problem associated with the formation of such seals from copper oxide glasses is the conversion of CuO to $Cu_2O$ during preparation of the glass compositions. The resulting $Cu_2O$ crystals are believed to be responsible for causing the seals to be porous rather than gas tight as required. The crystals may also form seeds or bumps on rods which are drawn from the glass for use in seal formation. These bumps sometimes break from the rod and contaminate the inside of the panel.

The process of the invention permits the formation of a copper seal glass in which the cuprous oxide crystal content is controlled so as to permit clean, gas tight seals to be formed.

BRIEF SUMMARY OF THE INVENTION

In accordance with this invention there is provided a process for preparing a copper containing seal glass in which the temperature, when CuO is present, is kept below a temperature which would cause deleterious seed or bump formation in the sealing glass. In one aspect of the invention a first portion of the glass including the relatively high melting point oxides of the glass composition is formed in the absence of copper oxide. A second portion of the glass is then formed which includes the relatively low melting point oxides. The temperature of the second portion is reduced to below about 800°C and the copper oxide is added. The two portions of the glass are then combined at a temperature below about 800°C and heated to form a homogeneous copper glass composition. The composition can then be cast or drawn to any desired shape.

DETAILED DESCRIPTION

The foregoing and other objects, features and advantages of the invention will be apparent from the following more particular description of preferred embodiments of the invention. In the illustrative examples the parts are parts by weight unless otherwise indicated.

The major portion of the glass sealing composition of the described embodiment of the invention is lead oxide. Such lead glasses provide the necessary softening and thermal expansion characteristics for sealing display panels. Minor amounts of other oxides are included to provide the required strength, softening point and coefficient of thermal expansion characteristics. These oxides include relatively high melting point oxides, for example, $Al_2O_3$, ZnO and $SiO_2$ and relatively low melting point oxides such as, for example, $B_2O_3$, $Bi_2O_3$ and CuO. A preferred composition range used in forming the glass compositions of the described embodiment of the invention comprises, for example, by weight, from about 64 to about 66% PbO, from about 1 to about 2% $Al_2O_3$, from about 0 to about 1.5% $Bi_2O_3$, from about 13 to about 15% $B_2O_3$, from about 10.5 to 12.5% ZnO, from about 2 to about 3% $SiO_2$ and from about 3.5 to 5% CuO.

The proportions of the oxides are not particularly critical and are chosen to give the required physical properties for any chosen application. However, it has been found that the $Al_2O_3$ should be kept at a maximum of about 2 %, otherwise it has been found that a non-homogeneous mixture is obtained which can also cause seeds or bumps which may break off and contaminate the article being sealed.

The glass is formed in two portions in the preferred mode for application where $Cu_2O$ formation should be minimized. The first portion, A, contains all of the relatively high melting point oxides together with a portion of the low melting point oxides. No copper oxide is included. Conveniently, about half the total amount of low melting oxides are included in the first portion. Accordingly, the $Al_2O_3$, ZnO, and $SiO_2$ are, mixed with about one half the total amount of PbO, $Bi_2O_3$ and $B_2O_3$ and heated until a homogeneous melt is obtained. The final melt temperature will be about 1,100°C plus or minus 20°C which is the minimum temperature needed to obtain a homogeneous melt. Higher temperatures can be employed but are unnecessary. The minimum temperature which is necessary to obtain a homogeneous melt will vary somewhat depending upon the particular composition. The heating time to obtain a homogeneous melt will vary from about 1 to 1¼ hour.

The proportion of oxides in the first portion of the glass based on the total weight of composition is preferably as follows, in percent by weight:

PbO 32.15 to 32.9, $Al_2O_3$ 1 to 2, ZnO 10.5 to 12.5, $SiO_2$ 2 to 3, $Bi_2O_3$ 0 to 0.75, $B_2O_3$ 6.5 to 7.5.

The second portion, B, of the glass is prepared from the remaining relatively low melting point oxides which are heated for a time and temperature necessary to obtain a homogeneous melt. The final melt temperature for the preferred composition should be at least about 1050°C plus or minus 20°C. Higher temperatures can be used but are unnecessary. The minimum temperature which is necessary to obtain a homogeneous melt will vary somewhat depending upon the particular composition. The heating time to obtain a homogeneous melt will vary from about ¾ to 1 hour. The proportions, in weight percent, of the second portion of the glass based on the total composition is then; PbO 32.15 to 32.9, $BiO_3$ 0 to .75, $B_2O_3$ 6.5 to 7.5, and CuO 3.5 to 5.

The copper oxide is not added to the melt until the melt has become homogeneous and the temperature of the melt is reduced to below about 800°C. The preferred temperature for adding the copper oxide is about 750°C plus or minus 20°C. This keeps the reduction of the cupric oxide to cuprous oxide to a minimum. After the copper oxide has been added, the melt is then stirred thoroughly and heated until it is homogeneous with the preferred times ranging from 1 to 1½ hours.

The two molten portions can then be mixed at a temperature below about 800°C, with a preferred temperature of 750°C plus or minus 20°C and heated until the melt is homogeneous or from about 3 to 3½ hours. The two glass portions can also be prepared in advance and quenched to form solid cullets. When remelting portion A it must be heated to the minimum temperature necessary to again obtain a homogeneous melt, for example, 1,100°C plus or minus 20°C. The temperature is then reduced to below 800°C prior to adding portion B which contains the copper oxide. It is not necessary to remelt portion B, it can be slowly added in cullet form to the portion A melt and stirred thoroughly in order to obtain a homogeneous mixture. Again, the preferred mixing temperature is 750°C plus or minus 20°C.

The glass is then cast or drawn into billets or rods of any desired shape. In order to draw seal rods directly from the melt, the melt temperature is conventionally reduced to between about 500° and 600°C.

It is also possible to mix all of the oxides in one portion at a high temperature and then reducing the temperature to below about 800°C before adding the CuO. For applications where high $Cu_2O$ contents can be tolerated the final mixing to obtain homogeneity with CuO present can be carried out by raising the temperature above 800°C with care being exercised to avoid times and temperatures which would result in an excessive amount of brown $Cu_2O$ precipitate. In general temperatures above about 950°C should be avoided.

The invention is further illustrated by, but is not intended to be limited to, the following examples.

EXAMPLE 1

The following preferred procedure was carried out in order to form glass rods suitable for sealing gas display panels. Batch A, containing the high melting point oxides, was formed from the following composition; 12.5% $B_2O_3$, 1.3% $Bi_2O_3$, 21.4% ZnO, 5% $SiO_2$, 1.8% $Al_2O_3$, and 58.0% PbO where the weight percentages are based on the relative proportions in batch A only.

The solid oxides are mixed together in batch form for 1 hour and a portion of the batch is charged to a platinum crucible and the crucible temperature is raised to about 1,000°C in order to melt the oxides. The remaining portion of the batch is added little by little until the entire batch is in solution after which the melt temperature is slowly raised to about 1,100°C plus or minus 20°C. The melt is fined at a temperature of 1,100°C plus or minus 20°C for a minimum of 1 hour but not longer than 1¼ hour. The melt is then quenched in deionized water to form a solid cullet which is dried in air at a temperature of about 180°C.

Batch B is prepared having the following weight composition; $B_2O_3$ 15.7%, $Bi_2O_3$ 1.7%, PbO 72.9%, and CuO 9.7% based on the relative proportions in batch B only.

The oxides, except the CuO, are mixed together in batch form for 1 hour at which time a portion of the batch is charged to a platinum crucible and the crucible temperature is raised to about 850°C to melt the oxides. The remaining portion of batch B is added little by little until the entire batch is in solution after which the melt temperature is slowly raised to about 1050°C plus or minus 20°C. The melt is fined at 1050°C plus or minus 20°C for a minimum of three fourths of an hour and for not more than 1 hour after which the melt temperature is permitted to reduce to about 750°C plus or minus 20°C. The copper oxide is then added to the melt at a melt temperature of about 750°C plus or minus 20°C. After all of the copper oxide is dissolved, the melt is thoroughly stirred. The melt is then fined at 750°C plus or minus 20°C for at least 1 hour but not longer than 1½ hours, after which the melt is quenched in deionized water to form a solid cullet which is dried in air at a temperature of 180°C. 55.7% by weight of batch A is combined with 44.3% by weight of batch B to form the final glass composition in the following manner. The batch A portion is remelted at a temperature of about 1,100°C plus or minus 20°C and the melt is fined at that temperature for about ½ hour. The melt temperature is then permitted to reduce to about 750°C plus or minus 20°C and the batch B portion is added little by little to the melt at that temperature. After all of the batch B cullet is dissolved in the melt, the melt was stirred thoroughly and then fined at about 750°C plus or minus 20°C for 3 hours but for not more than 3½ hours. The homogeneous melt is poured into molds from the melt temperature and allowed to cool slowly to room temperature. Alternatively, billets can be drawn directly from the melt at the melt temperature of 750°C plus or minus 20°C and allowed to cool slowly to room temperature. Glass rods are redrawn from the processed billets of the desired dimension and shape for use in sealing together electrode bearing glass substrates to form a gas panel. A suitable process for redrawing the glass rods is to locally heat the billets at the point where the rod is drawn from the billet at temperatures of between about 400° to 450°C. Rods of from about 35 to 100 mil in diameter are preferred for use in forming gas panel seals.

When used to seal gas panels, 35 mil in diameter rods drawn from the glass composition prepared according to example 1 produced excellent seals having the required characteristics of thermal expansion, softening point, strength, and were gas tight. The total composition, by weight, of the glass prepared in example 1 is as follows; copper oxide 4.3%, $B_2O_3$ 13.9%, $Bi_2O_3$ 1.5%, ZnO 11.9%, $SiO_2$ 2.8%, $Al_2O_3$ 1.0% and PbO 64.6% by weight. The coefficient of thermal expansion is 83 × $10^{-7}$/°C and the softening temperature is 424°C.

The process of example 1 was repeated in order to prepare the following glass compositions which had coefficients of thermal expansion in the range of 83.6 to 86 × $10^{-7}$/°C and softening temperatures in the range of about 414° to 422°C. The compositions, in weight percent, are given in Table 1 below:

TABLE I

| Composition | Glass No. 1 | Glass No. 2 | Glass No. 3 | Glass No. 4 | Glass No. 5 | Glass No. 6 | Glass No. 7 |
|---|---|---|---|---|---|---|---|
| PbO | 66 | 66 | 66 | 65.8 | 66 | 64.8 | 64.6 |
| $B_2O_3$ | 14 | 14 | 14 | 13.9 | 13.9 | 14.0 | 14.5 |
| $SiO_2$ | 3 | 2 | 2 | 2.6 | 2.2 | 2.8 | 2.6 |
| $Al_2O_3$ | 1 | 1 | 1.5 | 1.5 | 1.5 | 1.20 | 1.0 |
| ZnO | 10.5 | 10.5 | 10.5 | 10.9 | 10.9 | 11.2 | 11.5 |
| CuO | 4.0 | 5.0 | 4.5 | 4.0 | 4.0 | 4.5 | 4.3 |
| $Bi_2O_3$ | 1.5 | 1.5 | 1.5 | 1.5 | 1.5 | 1.5 | 1.5 |

EXAMPLE 2

The following example illustrates the formation of the sealing glass composition where all of the oxides are mixed in a single portion. The oxides were weighed to the following weight percents: PbO 64.6, $B_2O_3$ 13.9, $SiO_2$ 2.8, $Al_2O_3$ 1.0, ZnO 11.9, $Bi_2O_3$ 1.5, and CuO 4.3. All of the oxides except CuO are mixed together in batch form for 1 hour and a portion of the batch is charged to a platinum crucible and the crucible temperature is raised to 1,000°C to form a liquid. The remaining portion of the batch is added little by little until the entire batch is in solution after which the melt temperature is slowly raised to about 1,100°C plus or minus 20°C. The melt is heated at a temperature of 1,100°C plus or minus 20°C for a minimum of 1 hour and no longer than 1¼ hours. The melt temperature is then reduced to 770°C plus or minus 20°C and the CuO is added little by little to the melt with the melt temperature being maintained at 770°C plus or minus 20°C. After all of the CuO has been added to the melt, the melt is thoroughly stirred and the melt temperature is slowly raised to 865°C plus or minus 20°C. The melt is fined at this temperature for a minimum of 3½ hours but not longer than 4 hours. The melt is then either poured into molds from the melt temperature or billets are drawn directly from the melt. The glass is allowed to slowly cool from the annealing temperature (350°C) to room temperature. Glass rods of desired dimensions and shapes can be redrawn from the process billets as discussed in example 1. It is found that the billets and rods at the time and temperatures employed will contain brown crystals if the melt fining temperature, at the fining times, employed are above 885°C. Somewhat higher temperatures can be tolerated under certain conditions of fining time and temperature, which conditions can be readily determined by one skilled in the art. However, it has been found that temperatures of above about 950°C should be avoided. The process described above in example 2 has been found to be satisfactory for applications where higher $Cu_2O$ contents can be tolerated. Where it is necessary to keep the $Cu_2O$ content to a minimum then the process of example 1 should be employed.

When it was attempted to conduct the process with an $Al_2O_3$ content above about 2% by weight, it was found that drawn rods contained colored seeds, stones, and lumps. The rods were easily shattered. This was believed to be due to phase separation in the mix. However, according to the invention by changing the proportion of the other oxides and keeping the $Al_2O_3$ content at or below about 2% a glass composition is obtained which has the required properties with respect to softening temperature, thermal expansion coefficient, and strength which is comparable to glasses having a higher $Al_2O_3$ content. At the same time, the process of the invention results in acceptable levels of conversion of CuO to $Cu_2O$ crystals (below about 10%) which are below the level which would cause porous seals.

While the invention has been particularly shown and described with reference to preferred embodiments thereof, it will be understood by those skilled in the art that various changes in form and details may be made therein without departing from the spirit and scope of the invention.

What is claimed is:

1. A process for forming a copper oxide containing sealing glass composition comprising the steps of:

forming a first portion of said glass, including the relatively high melting point oxides, said portion consisting essentially of, by weight based on the total weight of said composition; PbO 32.15 to 32.9%, $Al_2O_3$ 1 to 2%, ZnO 10.5 to 12.5%, $SiO_2$ 2 to 3%, $Bi_2O_3$ 0 to .75%, $B_2O_3$ 6.5 to 7.5%, in the absence of CuO by heating said first portion until homogeneous melt is formed at a melt temperature of about 1,100°C for at least about 1 hour and no more than about 1¼ hour;

forming a second portion of said glass, including the relatively low melting point oxides, said portion consisting essentially of, by weight based on the total weight of said composition; PbO 32.15 to 32.9 percent, $Bi_2O_3$ 0 to 0.75%, $B_2O_3$ 6.5 to 7.5%, and CuO 3.5 to 5% by heating said second portion, except said CuO, until a homogeneous melt is formed at a melt temperature of about 1050°C for at least about ¾ hour and not more than about 1 hour, reducing the temperature of said melt to from about 750° to about 800°C, adding the CuO to the melt and maintaining the melt at temperatures from about 750° to about 800°C until the melt is homogeneous;

combining said first and second portions at a temperature of from about 750° to about 800°C and maintaining the resulting combined melt of said first and second portions at a temperature of from about 750° to about 800°C until said melt is homogeneous, and cooling said melt to produce a glass composition in which the conversion of CuO to $Cu_2O$ is below about 10% by weight.

2. The process of claim 1 in whicch the sealing glass has a thermal expansion coefficient ranging from about 83.6 to 86 × $10^{-7}$/°C and a softening temperature of between about 414° to 422°C.

3. The process of claim 1 including casting said combined melt in a mold and letting said glass composition cool to form a solid billet.

4. The process according to claim 1 including the step of drawing a glass billet from said combined melt.

5. The process of claim 1 including the step of reducing the mixture temperature to from between about 500° to 600°C and drawing a glass rod from said combined melt.

\* \* \* \* \*